Aug. 18, 1942.  F. R. RUSSELL ET AL  2,293,270
VALVE
Filed May 8, 1941

Francis R. Russell  
Paul E. Kuhl  Inventors
By  J. C. Small  Attorney

Patented Aug. 18, 1942

2,293,270

UNITED STATES PATENT OFFICE 2,293,270

VALVE

Francis R. Russell, Elizabeth, and Paul E. Kuhl, Madison, N. J., assignors to Standard Oil Development Company, a corporation of Delaware Application May 8, 1941, Serial No. 392,432

1 Claim. (Cl. 251—75)

The present invention is concerned with an improved valve for utilization in controlling the flow of fluids containing solid suspensions. The valve essentially comprises a piston functioning as a stem which slides back and forth over a port in the wall of the valve housing to open and close the circuit. The valve is preferably fitted with a packing which functions to sweep all solid particles ahead of the piston.

It is known in the art to utilize valves which vary widely in character and design for controlling the flow of fluids. The conventional type valves, however, have not been found particularly satisfactory for controlling the flow of fluids containing solid suspensions therein due to a number of reasons, one of which is that the solids settle out, as for example, one the seat of the valve and prohibit a satisfactory closure thereof. These difficulties encountered are particularly aggravated in the various catalytic cracking operations in which suspended powdered catalysts are employed and in the various isomerization operations utilizing liquid slurries, and the like. In these and in related operations it is essential that the flow of the respective streams be positively and accurately controlled in order to secure a satisfactory operation, which cannot be readily attained by the use of conventional type valves. We have however, now discovered an improved type valve which may be readily adapted for controlling the flow of fluid streams in operations of this character.

Figure 2:
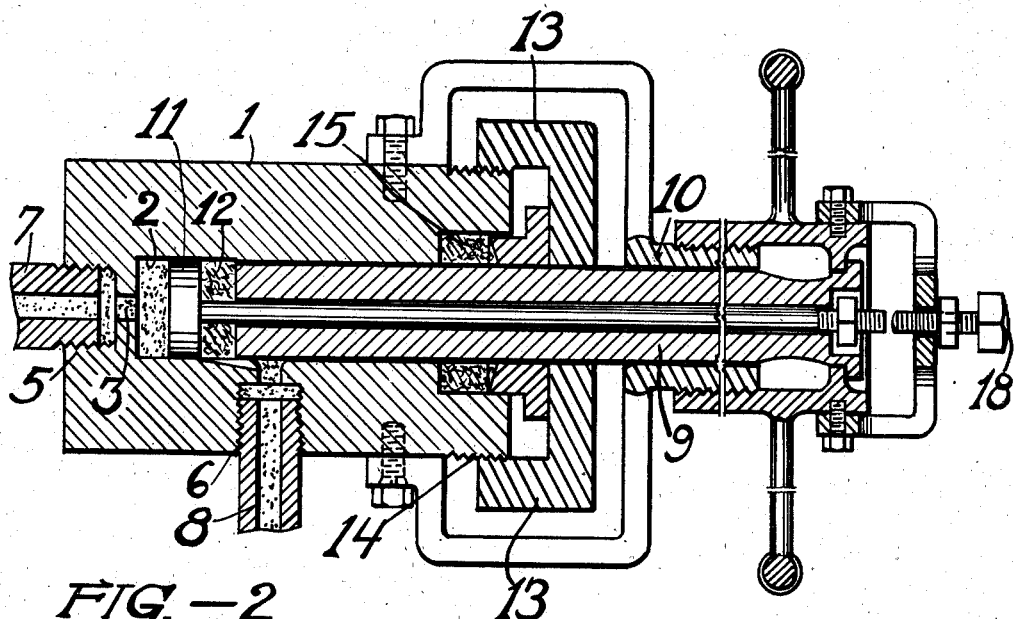
Figure 1:
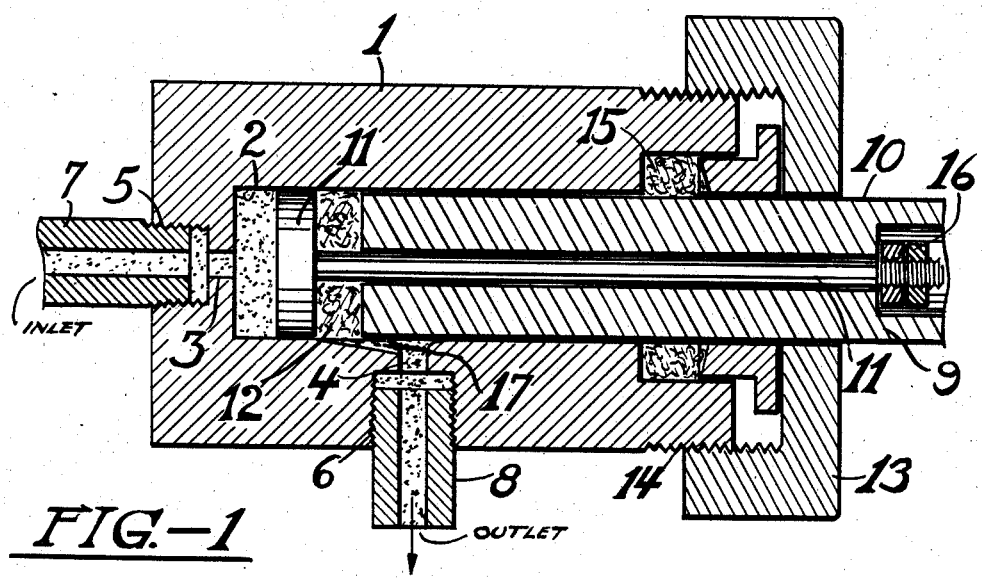

Our invention may be readily understood by reference to the drawing illustrating modifications of the same. Figure 1 illustrates one modification of the valve while Figure 2 illustrates an adaptation of a valve in which the pressure on the packing is readily controlled in order to facilitate its operation.

Referring specifically to Figure 1, our valve comprises a valve body 1 having a cylindrical bore 2. Ports 3 and 4 communicate through the valve body with the cylindrical bore. These ports may function to be inlet and outlet ports, respectively. For the purpose of description it is assumed that threaded means 5 and 6 are recessed in the valve body in order to attach securely thereto lines 7 and 8 communicating with the respective ports 3 and 4. A cylindrical piston element 9 comprising an outer stem 10 and an inner stem element 11 is designed to move within the bore 2 of the valve housing element 1. As the cylindrical element 9 moves along through the bore it closes port 4 and prevents communication between port 4 and port 3.

In accordance with a preferred modification of our invention, inner stem element 11 comprises a mushroom element in which the area between the head of the outer stem 10 and the lower surface of the mushroom head is packed with a suitable packing material 12. This is illustrated by Figure 2. Thus, as the cylindrical piston element 9 moves across port 4, the packing functions to sweep before the piston, solid materials and thus clear the valve seat so that the outer stem may pass freely across the valve seat and effectively prevent communication between the respective ports.

The valve body is also provided with a packing nut 13 which is adapted, by screw and regulating means 14, to regulate pressure on packing means 15, so that a tight seal is maintained between the valve body and the outer stem. Inner piston stem 11 is also provided with a packing adjustment nut 16 by which the pressure on the packing between the outer stem and the mushroom head is regulated.

The valve may be modified considerably. The stem may be moved back and forth across the port by any suitable method as, for example, by hydraulic means, by an electromagnet, by a compressed air diaphragm motor, or simply by a threaded portion with a bonnet and handle similar to an ordinary hand operated valve. Ordinarily the valve is not utilized for a throttling action but is simply employed for opening and closing the line. However, by providing port 4 with a shallow tapered groove or nick 17 on the inlet side of the valve some throttling action is readily attained.

The packing employed may be any suitable commercial packing which can withstand the chemical action of the fluid and the temperature in use. A preferred packing for all but high temperature service is sold under the trade name of "Duprene," "Neoprene," "Thiokol," etc. In some cases rubber or leather will be satisfactory. In any case, it should be sufficiently soft and compressible to be readily forced against the wall of the bore 2 and at the same time sufficiently hard and tough to minimize extrusion into port 4 or past stem 9. The above-named synthetic rubbers have proven quite satisfactory even at pressures of a thousand atmospheres and more. The thickness of the packing 12 or the area of the packing in direct contact with the bore of the body, may vary widely; usually about ¼ inch will suffice. With the construction shown the force exerted by the pressure on the face of the mushroom stem 11 will be supported on a smaller area of packing so that the pressure exerted by the packing against the cylindrical bore is greater than the pressure of the liquid in the bore and thus leakage is prevented. In general, it is preferred that the area of the packing be 60% to 90%, preferably 70% to 75% of the total area of the mushroom head. Washers of a soft material could be sandwiched between washers of harder materials for the packing, for example, a Duprene washer between two leather washers.

By operating in this manner the packing is squeezed towards the confining wall with more pressure than exists in the liquid shut off by the valve, so that the higher the pressure the better the seal. Such a valve requires that the packing be able to flow under moderate stress. The initial seal at little or no pressure is made by an oversize rubber, leather, Duprene, washer, or equivalent, fitted to the bore by entry through a tapered entrance to the bore. The initial seal is preferably attained by tightening the nut on the inner stem so as to squeeze the mushroom tip back against the soft packing. This feature also permits adjusting the packing for wear on the side wall. The outer stem is prevented from leaking by a conventional stuffing box, lantern ring, or packing gland as shown.

A preferred adaptation of our invention is shown in Figure 2, in which the force to move the stem into the valve body is transmitted through the inner stem and the force to move the cylinder out of the valve body is applied to the outer stem. By operating in this manner the nut on the inner stem is tightened sufficiently to force the packing lightly against the cylinder wall to provide the initial sealing pressure. When the fluid pressure is applied against the face of the mushroom head, the packing is compressed resulting in a tight seal, provided that the tension on the inner stem is first relieved by backing off the handwheel after the valve is closed until an opening exists between threaded screw 18 and the end of the inner stem 11. When the valve outer stem is lifted, the compression of the packing due to the pressure on the upstream side of the valve is relieved, thus permitting the valve piston to be readily and easily moved. However, if force is applied to the outer stem in the opposite direction when closing the valve, additional compression is applied to the packing which makes it difficult to move the stem. To obviate this, we propose to apply the force necessary to close the valve to the inner stem. This relieves the compression of the packing and transmits the force to the outer stem through the packing adjustment nut on the inner stem.

This method of operating the valve may be accomplished in a number of ways. An illustration of one method of operation would be to provide a rising hand-wheel with a collar operating in a loosely fitted slot in the outer stem. However, the wheel is also provided with a screw 18 which rides upon the inner stem when lowering the valve wheel before the collar reaches the lower side of the slot in the outer stem mentioned above.

What we claim as new and wish to protect by Letters Patent is:

Improved valve adapted for controlling the flow of fluids containing solid suspensions, comprising a valve body having a cylindrical bore, inlet and outlet ports communicating through the valve body to the bore, a piston adapted to move within the bore to prevent communication between the respective ports, said piston comprising a hollow cylindrical outer stem and an inner mushroom head stem, suitable packing disposed between the underside of the mushroom head and the head of the outer cylindrical stem and means to transmit the force to move the valve into the valve body through the inner stem and means to transmit the force to move the valve out of the valve body through the outer stem.

FRANCIS R. RUSSELL.
PAUL E. KUHL.